United States Patent [19]

Higuchi

[11] 3,774,739
[45] Nov. 27, 1973

[54] MAGNETIC CLUTCH

[75] Inventor: Hideo Higuchi, Aichi-ken, Japan

[73] Assignee: Nippondenso Co., Ltd., Kariya-shi, Aichi-ken, Japan

[22] Filed: Mar. 30, 1972

[21] Appl. No.: 240,877

[30] Foreign Application Priority Data

| Apr. 9, 1971 | Japan | 46/27195 |
| June 11, 1971 | Japan | 46/49861 |
| Aug. 9, 1971 | Japan | 46/71249 |
| Dec. 17, 1971 | Japan | 46/119683 |
| Jan. 20, 1972 | Japan | 47/9153 |

[52] U.S. Cl. ........... 192/84 C, 64/27 NM, 192/89 R, 192/106.1, 267/153
[51] Int. Cl. .......................... F16d 27/10, F16d 3/14
[58] Field of Search ................. 192/55, 70.17, 84 R, 192/84 A, 84 AA, 84 AB, 84 C, 89 R, 106.1; 267/153; 64/27 NM

[56] References Cited
UNITED STATES PATENTS

| 2,927,674 | 3/1960 | Everitt | 192/107 M |
| 3,384,213 | 5/1968 | Bernard et al. | 192/84 C |
| 3,455,421 | 7/1969 | Miller | 192/84 C |
| 3,557,573 | 1/1971 | Hansgen | 64/27 NM X |
| 1,896,968 | 2/1933 | Paton | 192/70.17 |
| 3,205,989 | 9/1965 | Mantey | 192/84 C |
| 3,232,077 | 2/1966 | Binder | 64/27 NM |
| 3,425,529 | 2/1969 | Hayashi | 192/84 C |
| 3,565,223 | 2/1971 | Pierce | 192/84 C |

*Primary Examiner*—Allan D. Herrmann
*Attorney*—John W. Malley et al.

[57] ABSTRACT

A magnetic clutch comprising a main rotating unit rotated from a driving source, a rotary shaft concentric with said main rotating unit and rotatable independent thereof and adapted to be connected to a driven member, an armature mechanically connected to said rotary shaft and placed opposite to said main rotating unit in the axial direction, said armature being movable in the axial direction to a first position separated from said main rotating unit by a predetermined distance and to a second position engageable with said main rotating unit to rotate therewith, and magnetic means for attracting said armature from the first position to the second position, wherein said armature and rotary shaft are connected to each other through the intermediary of a coupling member comprising a cylindrical elastic material concentric with said rotary shaft and having a first and second cylindrical surfaces, said first cylindrical surface being mechanically connected to said armature and said second cylindrical surface being mechanically connected to said rotary shaft, whereby the axial elastic strain produced in said coupling member at the second position of said armature produces a force which causes said armature to return to the first position.

16 Claims, 17 Drawing Figures

MAGNETIC CLUTCH

FIELD OF THE INVENTION

The present invention relates to magnetic clutches and more particularly to a magnetic clutch which is used, for example, to intermittently engage and disengage an automotive air-conditioning compressor with the automobile engine shaft.

Figure 1:
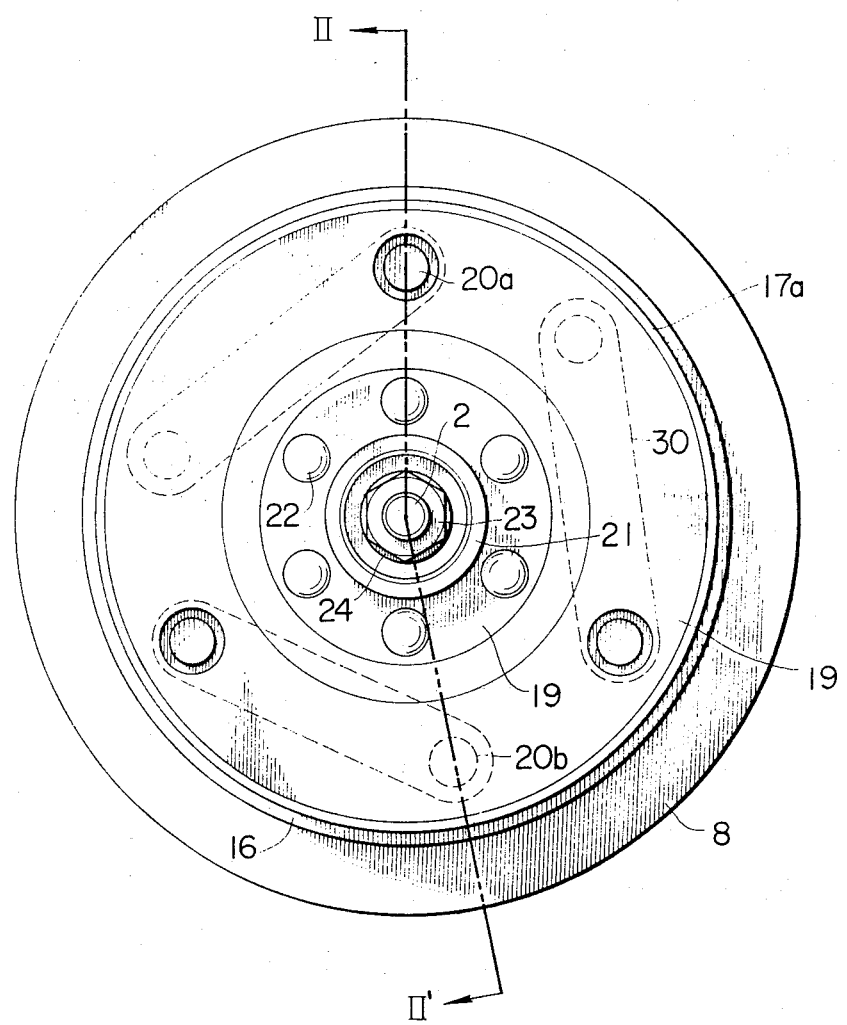
FIG. 1 is a front view of a magnetic clutch known in the art.
Figure 2:
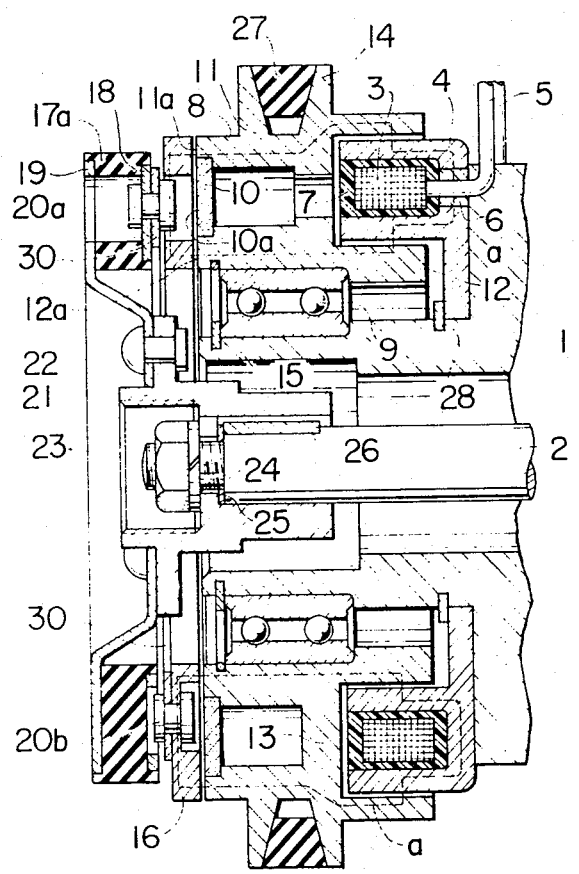
FIG. 2 is a longitudinal sectional view taken along the line II - II' of FIG. 1.

In known clutches of this type, as for example illustrated in FIGS. 1 and 2, an annular flat-shaped cushion rubber 17a is used to lessen the force of a shock applied to the compressor and three to four leaf springs 30 are disposed on the circumference of a first retaining plate 18 to which the cushion rubber is securely bonded, with one end of the leaf springs 30 being fixed securely by rivets 20a. The other ends of the leaf springs 30 are securely fixed by similar rivets 20b to an armature 16 which is attracted to a main rotating unit 8 when a current is supplied to an excitation coil 3. A second retaining plate 19 to which the cushion rubber 17a is also bonded is secured to a hub 21 by a plurality of rivets 22.

With the construction described above, when the excitation coil 3 is energized producing magnetic flux in a magnetic circuit shown by broken lines a in FIG. 2, the armature 16 is attracted to the main rotating unit 8 so that the rotation of the main rotating unit 8 is transmitted to a rotary shaft 2 of the compressor through the members including the armature 16, leaf springs 30, first retaining plate 18, flat-shaped cushion rubber 17a, second retaining plate 19 and hub 21. In this case, the impact load applied to the compressor is lessened by the torsion of the cushion rubber 17a in the rotational direction. When the excitation coil 3 is de-energized, the armature 16 is returned to its original position by the restoring force of the leaf springs 30.

A disadvantage of conventional magnetic clutches of the type constructed as described above is that the annular flat-shaped cushion rubber 17a is employed solely for the purpose of absorbing the impact load applied to the compressor and thus a plurality of the armature returning leaf springs 30 are needed to return the armature 16 to its original position making the construction more complicate and requiring more time for assemblage.

SUMMARY OF THE INVENTION

In order to solve the foregoing deficiency it is therefore the object of the present invention to provide a magnetic clutch, wherein a cylindrical cushion rubber adapted to perform the function of absorbing the force of a shock in the direction of rotation and the armature returning function is provided between the armature and the hub connected to the rotary shaft on the compressor side in the rotation transmitting path of the magnetic clutch, and said cushion rubber is preliminarily provided with an elastic force which acts in the restoring direction (hereinafter referred to as an initial reaction force). Thus, the magnetic clutch according to the present invention needs no armature returning leaf spring, is simple in construction and ensures the positive returning of the armature.

The above and other objects as well as the features and advantages of the magnetic clutch of the present invention over the prior art magnetic clutches will be readily apparent from the following description of preferred embodiments when read in conjunction with the accompanying drawing.

DESCRIPTION OF THE PREFERRED EMBODIMENTS

Figure 3:
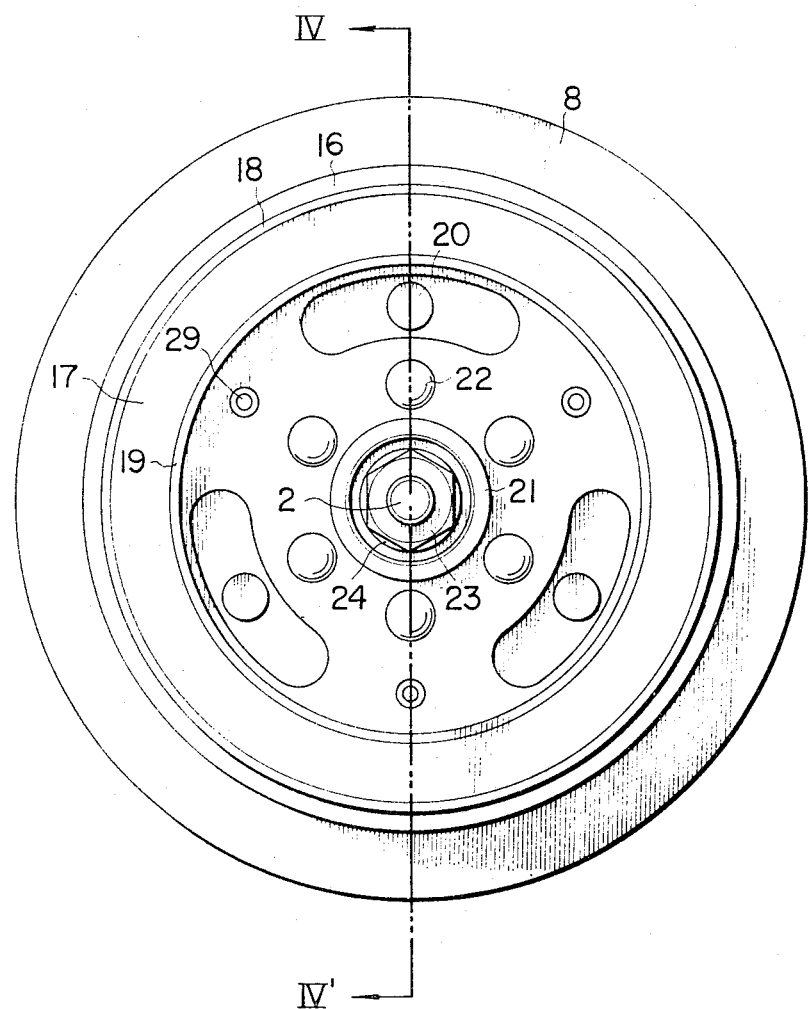
FIG. 3 is a front view showing an embodiment of the magnetic clutch according to the present invention.

The present invention will now be explained with reference to the illustrated embodiments. Now referring first to FIGS. 3 and 4, numeral 1 designates a compressor housing; 2 a rotary shaft of the compressor; 3 an excitation coil mounted in a stator housing 4 and wound into a cylindrical form. The excitation coil 3 connected to the external power source (not shown) by lead wires 5. Numeral 6 designates a bushing through which the lead wires 5 are brought to the outside of the stator housing 4. The excitation coil 3 is securely mounted in the stator housing 4 by a frame member 7 of a molded resin. Numeral 8 designates a main rotating unit having a pulley formed as an integral part thereof. The main rotating unit 8 comprises a bearing 9, a friction plate 10, inner and outer magnetic circuit portions 11 and 12, a reinforcing connecting portion 13 connecting the inner and outer magnetic circuit portions 11 and 12 together, and a V-grooved portion 14. The bearing 9 is mounted in the compressor housing 1 and is secured to the housing 1 by a circlip 15. The inner and outer magnetic circuit portions 11 and 12 are adapted to rotate along the inner and outer peripheries of the stator housing 4. The friction plate 10 is attached to the inner and outer magnetic circuit portions 11 and 12 with a binder. Numerals 11a and 12a designate the attracting surfaces of the inner and outer magnetic circuit portions 11 and 12, respectively, which are normally placed opposite to an armature 16 and spaced away therefrom by a predetermined distance to attract the armature 16 by the magnetic force of the magnetic circuit. The attracting surfaces 11a and 12a are substantially flush with a surface 10a of the friction plate 10. Numeral 17 designates a cylindrical coupling member of an elastic material which is attached to a first retaining plate 18 and a second retaining plate 19 concentric therewith, the first and second retaining plates 18 and 19 being made of steel sheet formed into a bell-shape. The first retaining plate 18 is secured to the armature 16 by a plurality of rivets 20 and the second retaining plate 19 is secured to a hub 21 by a plurality of rivets 22. The hub 21 is in turn mounted on the compressor shaft 2 by a nut 23, a spring washer 24 and so on. In this case, to provide the aforesaid predetermined distance between the armature 16 and the attracting surfaces of the main rotating unit 8, several adjust washers 25 are provided, after adjustment, between the compressor shaft 2 and the hub 21. Numeral 26 designates a flat key; 27 a belt for transmitting the rotation from the engine (not shown) to the main rotating unit 8; 28 a circlip for attaching the stator housing 4 to the compressor housing 1. Numeral 29 designates pressure means consisting of a plurality of protruding portions formed in the second retaining plate 19 and stamped out toward the armature 16 thereby producing an axial strain in the elastic coupling member 17 and thus providing the first retaining plate 18 connected to the armature 16 with a force which acts toward the left in FIG. 4, i.e., an initial reaction force. In this way, the distance between the armature 16 and the attracting surfaces of the main rotating unit 8 is positively ensured and thus the armature 16 and the main rotating unit 8 are normally held apart from each other.

The magnetic clutch of the present invention constructed as described above operates as follows:

When a DC current is supplied to the excitation coil 3 a magnetic flux is produced as shown by the armature 16 a so that the attracting surfaces 11a and 12a of the main rotating unit 8 attract the armature 16 and stick fast thereto. At this time, since the cylindrical coupling member 17 is deflected in the axial direction to the extent equal to the distance between the attracting surfaces of the main rotating unit 8 and the armature 16 and since the main rotating unit 8 is being driven from the engine through the belt 27, this driving force is transmitted to the armature16 and hence to the coupling member 17. Up to this time the compressore has been at rest and thus the force produced by the load and the moment of inertia of the compressor and the force by the driving force and the moment of inertia of the rotating driving parts are impulsively applied to the coupling member 17 so that the coupling member 17, in its axially deflected state, is further twisted in the direction of rotation thereof. This action of the coupling member 17 lessens the impact force and permits the transmission of the driving force to the compressor.

When the excitation coil 3 is de-energized, the attractive force acting on the armature 16 collapses so that the armature 16 is returned to its original position by the restoring force of the coupling member 17 by its elasticity (the restoring force from the axial deformation) and the initial reaction force of the coupling member 17.

Figure 4:
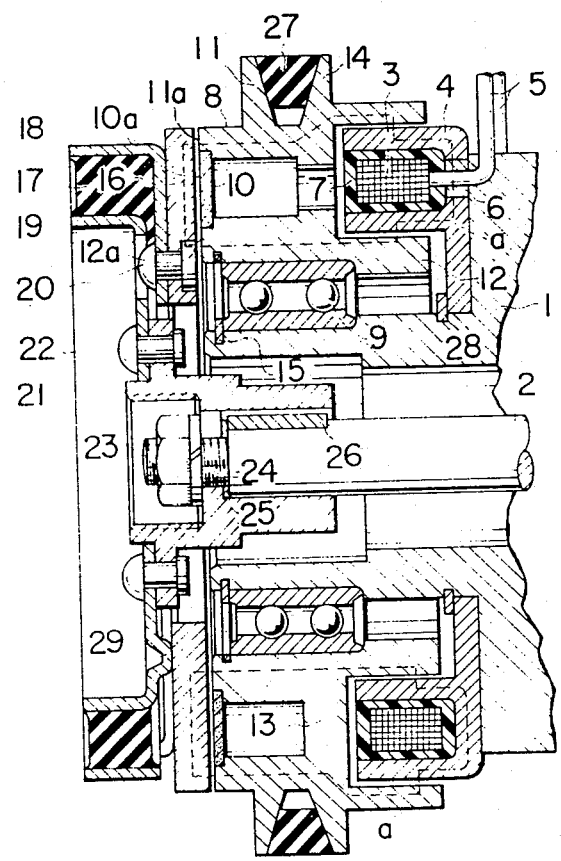
FIG. 4 is a longitudinal sectional view taken along the line IV - IV' of FIG. 3.
Figure 5:
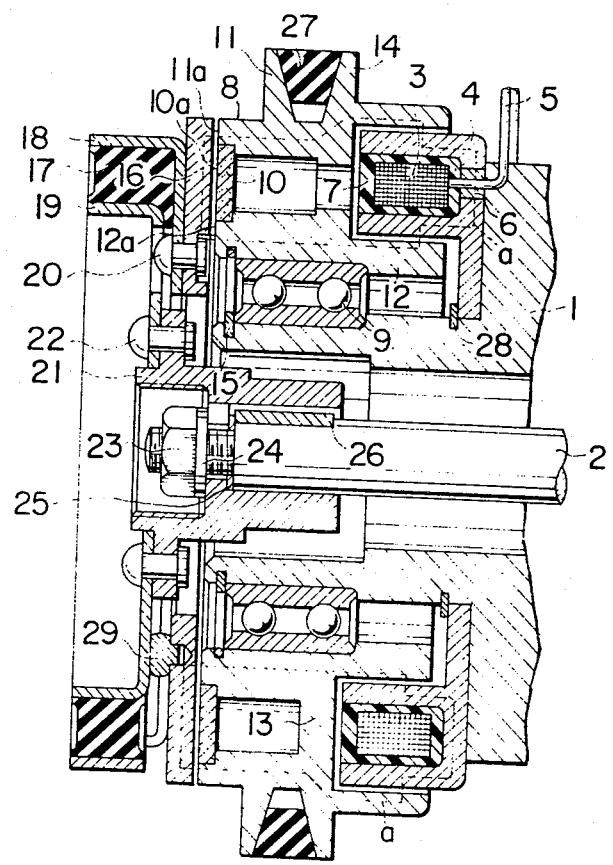
FIG. 5 is a longitudinal sectional view of a partially modified form of the magnetic clutch shown in FIG. 4.

While in the embodiment described above the coupling member 17 has been described as being provided with the initial reaction force acting toward the left in FIG. 4 by the pressing means 29 consisting of a plurality of protruding portions formed in the second retaining plate 19 and stamped out toward the armature 16, a modified form of the pressing means 29 consisting of a plurality of elastic members may be disposed between the armature 16 and the second retaining plate 19 so as to provide the coupling member 17 with the required initial reaction force which acts toward left in FIG. 5 by the pressing means 29.

Figure 6:
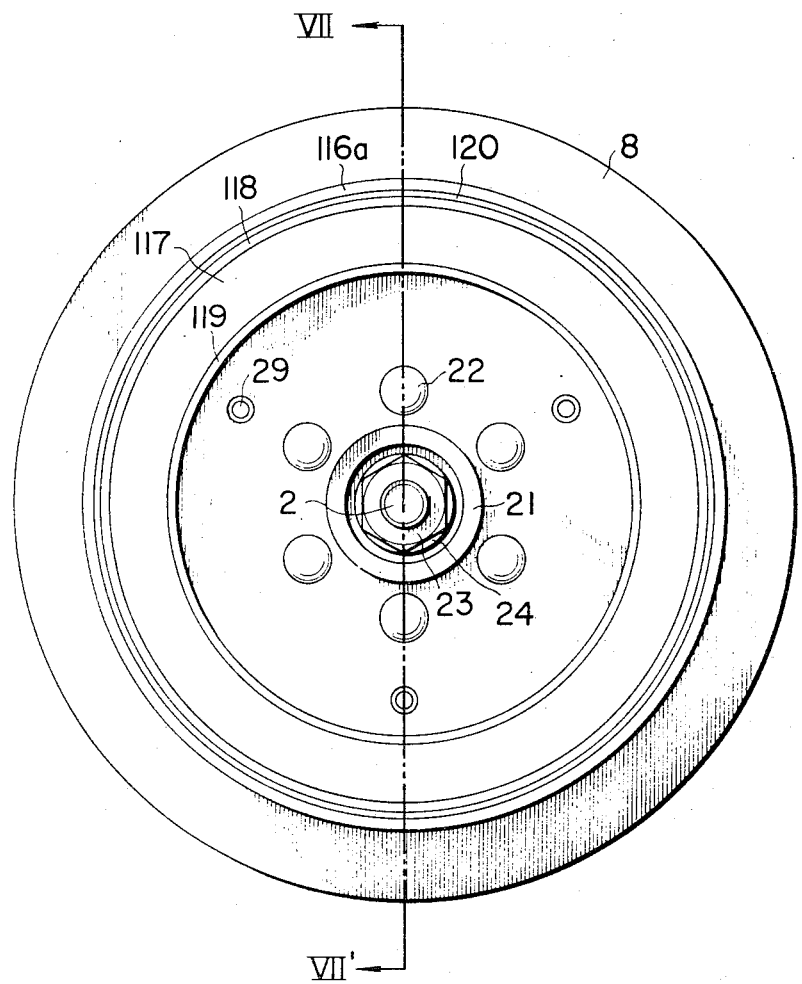
FIG. 6 is a front view of another embodiment of the magnetic clutch according to the present invention.
Figure 7:
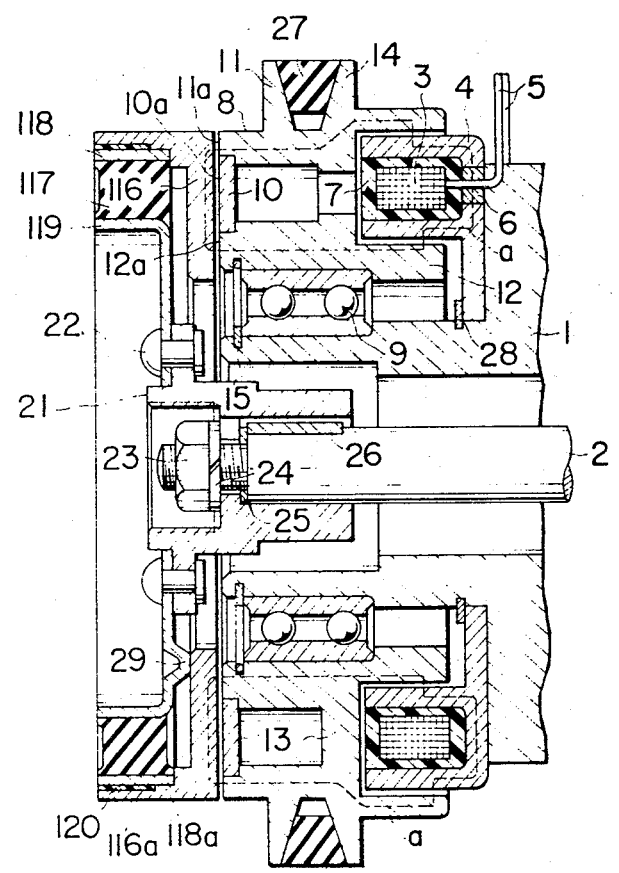
FIG. 7 is a longitudinal sectional view taken along the line VII - VII' of FIG. 6.

Referring now to FIGS. 6 and 7, another embodiment of the present invention will be explained. In the figures, identical numerals as used in FIGS. 3 and 4 designate the identical or similar parts. A coupling member 117 formed into a cylindrical shape is bonded to a first retaining plate 118 of sheet steel formed into a cylindrical shape and a second retaining plate 119 of steel sheet formed into a bell shape. In this case, the outer diameter of the cylindrical coupling member 117 is compressed by about 10 percent by the first retaining plate 118 to increase the strength of the coupling member 117. A portion 118a of the first retaining plate 118 is driven in the stepped inner peripheral portion of a cylindrical retaining plate mounting member 116a formed integral with an armature 116, and epoxy resin 120 is filled in the whole space between the retaining plate mounting member 116a and the first retaining plate 118 securely bonding them together along the whole outer periphery of the first retaining plate 118 and the whole inner periphery of the retaining plate mounting member 116a. The second retaining plate 119 is also secured to the hub 21 by a plurality of the rivets 22. Numeral 29 designates pressing means consisting of a plurality of protruding portions formed in the second retaining plate 119 and stamped out toward the armature 116 thereby providing the coupling member 117 with the initial reaction force which acts towards the left in FIG. 7.

In the case of this embodiment, since the outer diameter of the coupling member 117 is compressed by about 10 percent by the first retaining plate 118 so as to increase the strength of the coupling member 117, the first retaining plate 118 is subject to the expansion stress of the coupling member 117, while as the armature 116 is attracted to the attracting surfaces 11a and 12a of the main rotating unit 8 an impact force is imparted to the coupling member 117 so that the stress caused by this impact force is applied to the first retaining plate 118. If, in this case, these two stresses are locally applied to the first retaining plate 118, there is the danger of the retaining plate 118 breaking down. However, since the retaining plate 118 and the retaining plate mounting member 116a formed integral with the armature 116 are firmly held together along the entire outer peripheries thereof, the local application of the stresses to the first retaining plate 118 is avoided, but these stresses are distributed all over the retaining plate 118 thereby preventing it from breaking down.

On the other hand, since the portion 118a of the first retaining plate 118 is driven in the retaining plate mounting member 116a and then the mounting member 116a and the retaining plate 118 are bonded together with the epoxy resin 120, the coupling member 117 is provided by the pressing means 29 with the initial reaction force which acts toward the left in FIG. 7. Thus, in order to prevent the first retaining plate 118 from moving in a direction opposite to the armature 116, the portion 118a of the first retaining plate 118 is driven in the stepped portion of the retaining plate mounting member 116a thereby simplifying the bonding of the first retaining plate 118 and the retaining plate mounting member 116a.

Figure 8:
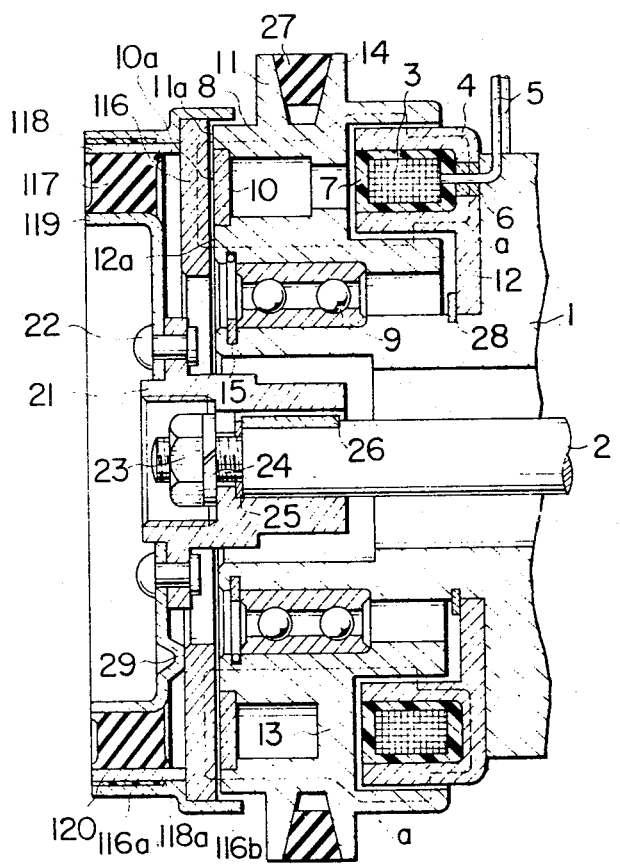
FIG. 8 is a longitudinal sectional view of a partially modified form of the magnetic clutch shown in FIG. 7.

While in the above-described embodiment the retaining plate mounting member 116a is formed integral with the armature 116, the retaining plate mounting member 116a may be made, as shown in FIG. 8, separately from the armature 116 by press working, so that the armature 116 and the retaining plate mounting member 116a are bonded together by welding. In this case, the space between the main rotating unit 8 and the armature 116 is covered by a portion 116b of the retaining plate mounting member 116a and in this way a spark due to the slip which occurs between the attracting surfaces 11a and 12a of the main rotating unit 8 and the armature 116 when the latter is attracted to the former may be prevented from shooting out to the outside.

Figure 9:
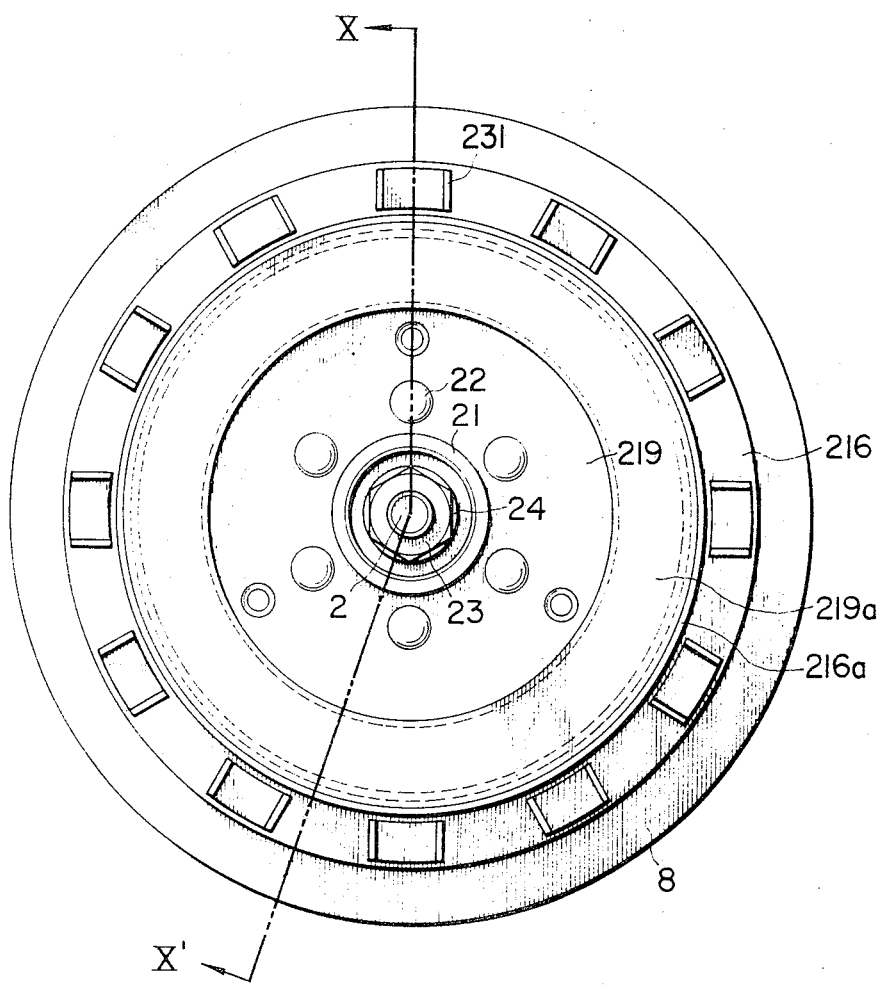
FIG. 9 is a front view showing a further embodiment of the magnetic clutch according to the present invention.
Figure 10:
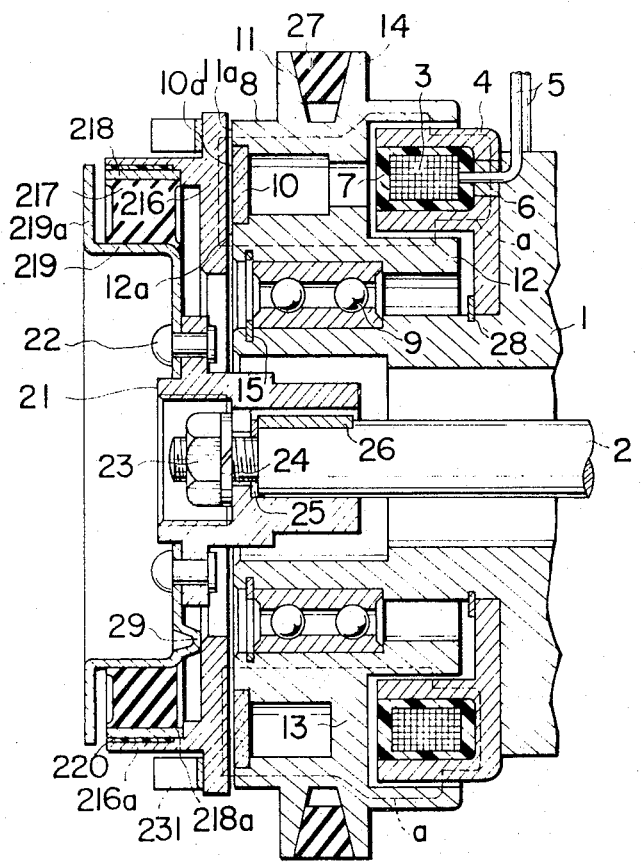
FIG. 10 is a longitudinal sectional view taken along the line X - X' of FIG. 9.

FIGS. 9 and 10 illustrate a further embodiment of the present invention. In this embodiment, a coupling member 217 formed into a cylindrical shape has its inner and outer peripheries bonded to a first retaining plate 218 of sheet steel formed into a cylindrical shape and a second retaining plate 219 of sheet steel formed into a bell shape, respectively, and the second retaining plate 219 is provided at the edge thereof an integrally formed flange portion 219a covering the coupling member 217. In this case, the outer diameter of the cylindrical coupling member 217 is compressed by about 10 percent by means of the first retaining plate 218 to improve the strength of the coupling member 217. On the other hand, a portion 218a of the first retaining plate 218 is driven in a cylindrical retaining plate mounting member 216a formed as an integral part of an armature 216, and epoxy resin 220 is filled into the entire space between the retaining plate mounting member 216a and the first retaining plate 218 firmly holding the whole outer periphery of the first retaining plate 218 and the whole inner periphery of the retaining plate mounting member 216a together. The second retaining plate 219 is also secured to the hub 21 by the plurality of rivets 22. Numeral 231 designates a U-shaped vane-type radiation member and in this embodiment 12 radiation members 231 are fixed by welding on the circumference of the armature 216 at regular intervals. When the armature 216 is attracted to or separated from the attracting surfaces 11a and 12a of the main rotating unit 8, slip occurs therebetween generating heat. This heat is radiated by means of the plurality of radiation members 213 fixed on the armature 216, thereby preventing the coupling member 217 from melting by heat. Even if the coupling member 217 has melted by any chance, the flange 219a formed integral with the second retaining plate 219 and covering the coupling member 217 prevents the armature 216 from projecting out of the magnetic clutch and thus causing damages to any other device.

Figure 11:
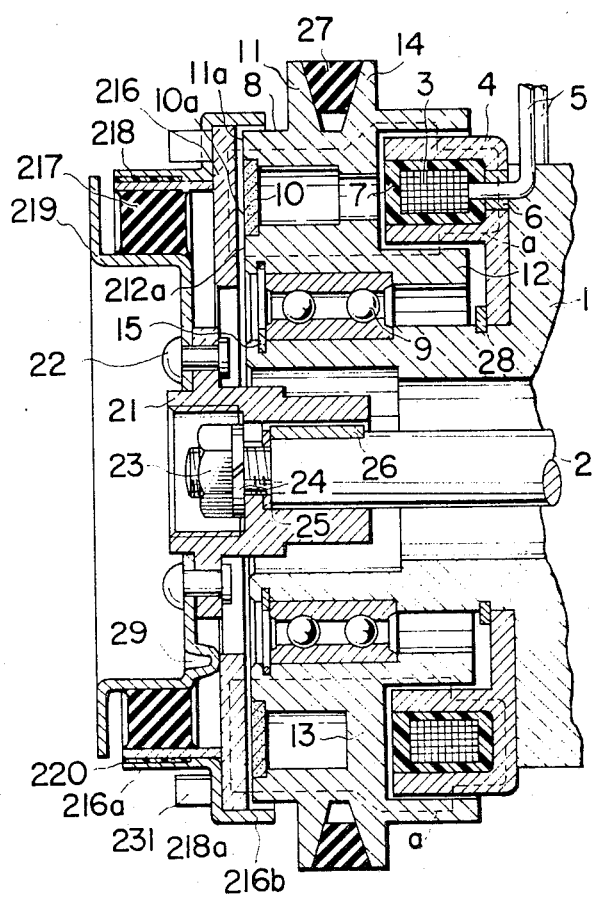
FIG. 11 is a longitudinal sectional view of a partially modified form of the magnetic clutch shown in FIG. 10.

FIG. 11 is a modified form of the embodiment of FIGS. 9 and 10 in which an extension 216b is formed at one end of the retaining plate mounting member 216a to cover the distance between the armature 216 and the main rotating unit 8, so that a spark caused by the slip which occurs between the armature 216 and the attracting surfaces 11a and 12a of the main rotating unit 8 when the former is attracted to the latter may be prevented from shooting out to the outside.

while in the embodiments described above the radiation members 231 are provided on the armature 216 or the retaining plate mounting member 216a, respectively, the radiation members 231 may be provided on any member mechanically connecting the armature to the coupling member and/or any member mechanically connecting the rotating shaft to the coupling member, that is, they may be directly provided on the second retaining plate 129, or the first retaining plate 218 or the hub 21 may be extended to provide the radiation members 231 thereon. In this case, there is no question that the coupling member 217 can be most effectively prevented from melting, if the radiation members 231 are provided on the armature 216 or the retaining plate mounting member 216a.

Figure 12:
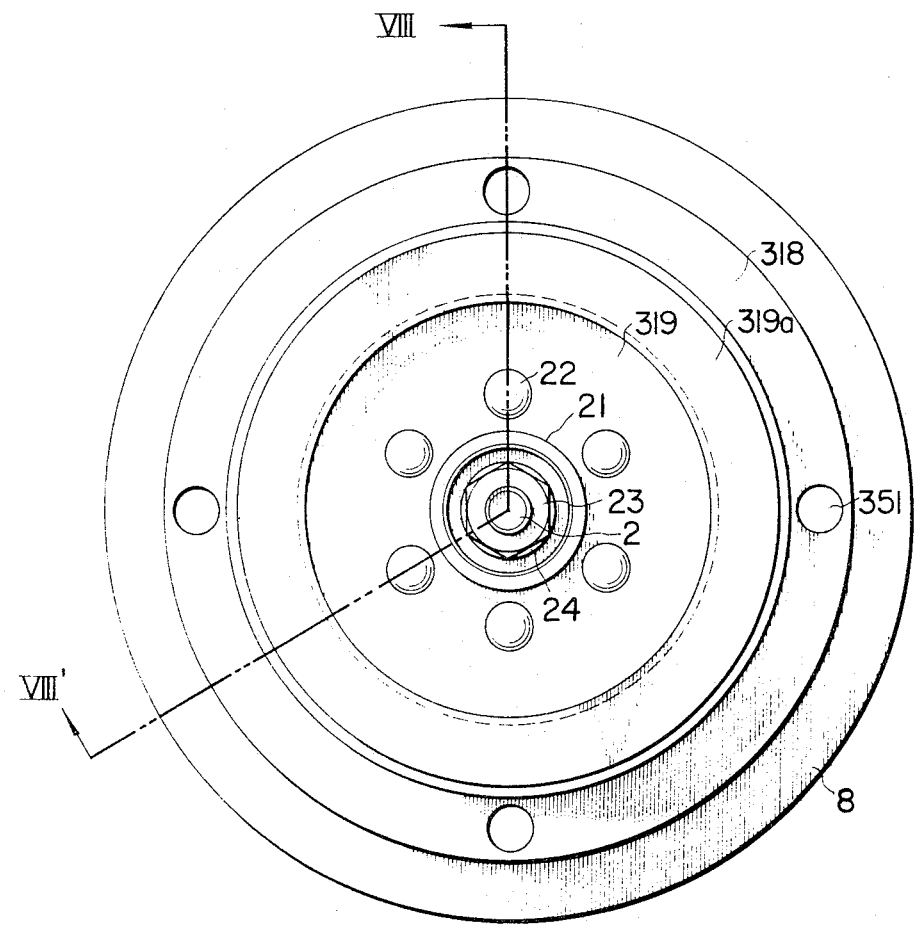
FIG. 12 is a front view showing a still further embodiment of the magnetic clutch according to the present invention.
Figure 13:
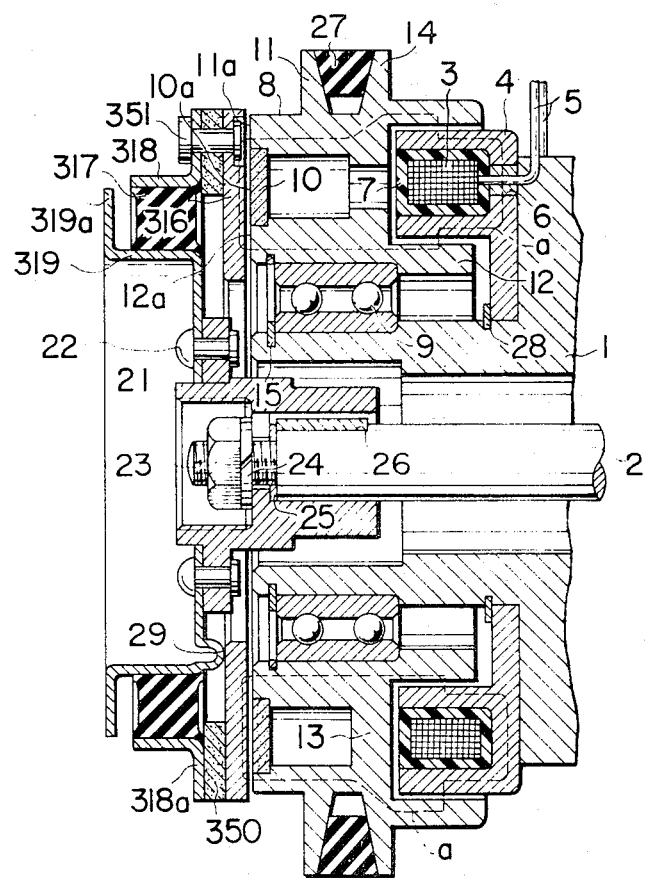
FIG. 13 is a longitudinal sectional view taken along the line XIII — XIII' of FIG. 12.

FIGS. 12 and 13 illustrate a further embodiment of the present invention. In this embodiment, the inner and outer peripheries of a coupling member 317 are bonded to a first retaining plate 318 made of sheet steel formed into a cylindrical shape and a second retaining plate 219 made of sheet steel formed into a bell shape, respectively, and the second retaining plate 319 is provided at the edge thereof with a flange portion 319a formed as an integral part thereof and covering the coupling member 317. In this case, the outer diameter of the cylindrical coupling member 317 is compressed by about 10 percent by the first retaining plate 318 to improve the strength of the coupling member 317. The first retaining plate 318 also has its portion 318a connected to an armature 316 by rivets 351 with heat insulating members 350 disposed on the circumference of the portion 318a and placed between the portion 318a and the armature 316. The heat insulating members 350 are made of insulating material such as asbestos and are provided at several places. The second retaining plate 319 is also secured to the hub 21 by a plurality of the rivets 22.

When the armature 316 is attracted to or separated from the attracting surfaces 11a and 12a of the main rotating unit 8, slip occurs between the attracting surfaces 11a and 12a and the armature 316 generating heat. The transmission of this heat to the coupling member 317 is prevented, however, by the heat insulating members 350 placed between the armature 316 and the first retaining plate 318 and having a relatively small volume, thereby preventing the coupling member 317 from melting by heat. A flange portion 319a is provided as an integral part of the second retaining plate 319 and it covers the coupling member 317, so that even if the coupling member 317 has melted, the armature 316 is not allowed to project out of the magnetic clutch and thus cause damages to any other devices.

Figure 14:
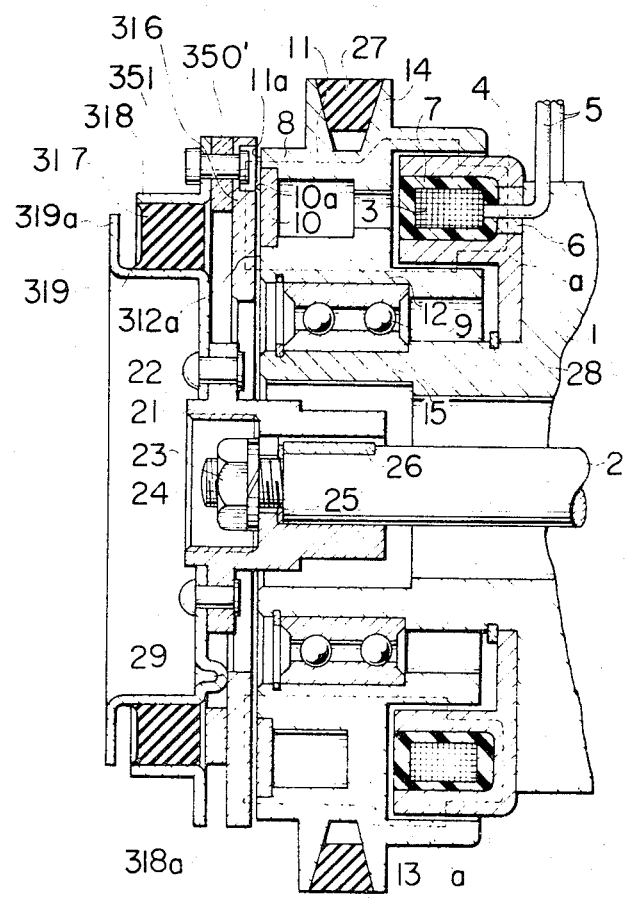
FIG. 14 is a longitudinal sectional view of a partially modified form of the magnetic clutch shown in FIG. 13.

It should be noted that while in the embodiment described above the heat insulating members 350 consisting of heat insulating material are provided between the armature 316 and the first retaining plate 318, if the amount of heat generated by the engagement and disengagement of the magnetic clutch is not large, there is no need to specially use the insulating members 350. Since the transmission of torque from the armature 316 to the first retaining plate 318 is effected by way of rivets 351, the insulating members 350 made of an insulating material may be replaced by metal washers 350' which, as shown in an embodiment in FIG. 14, are fited on the rivets 351 so as to leave a given gap between the armature 316 and the first retaining plate 318 thereby providing the required heat insulation therebetween.

Figure 15:
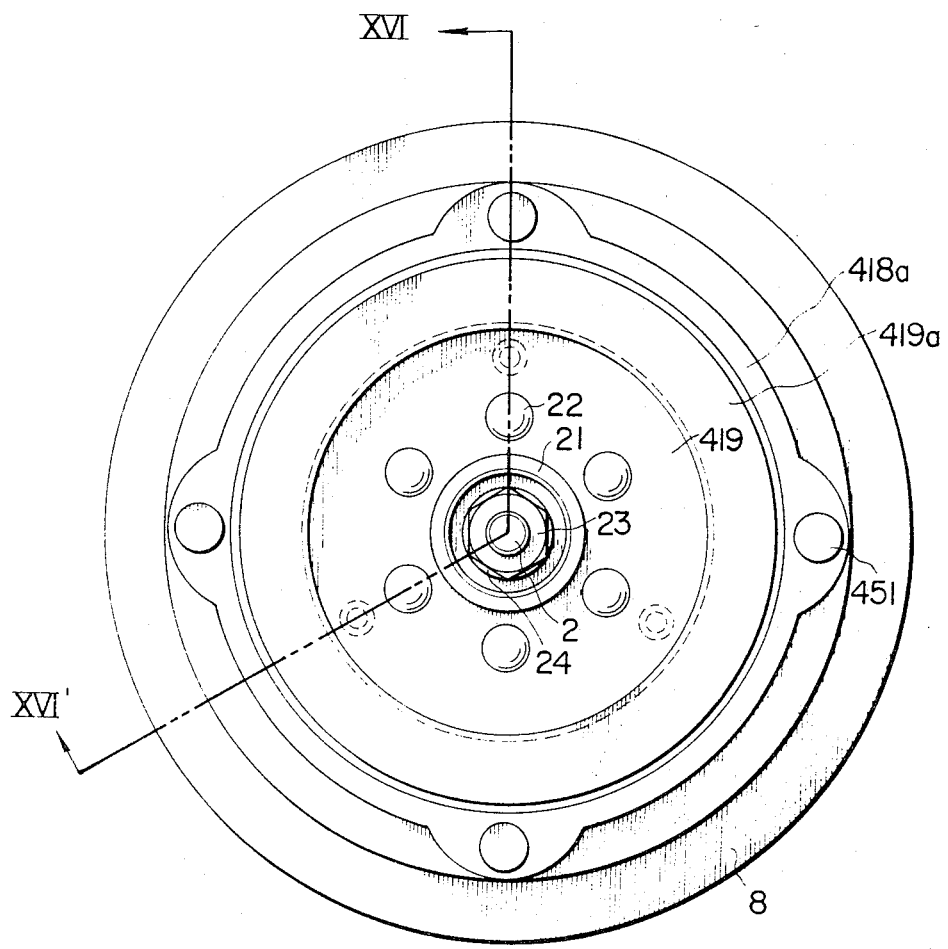
FIG. 15 is a front view showing a still further embodiment of the magnetic clutch according to the present invention.
Figure 16:
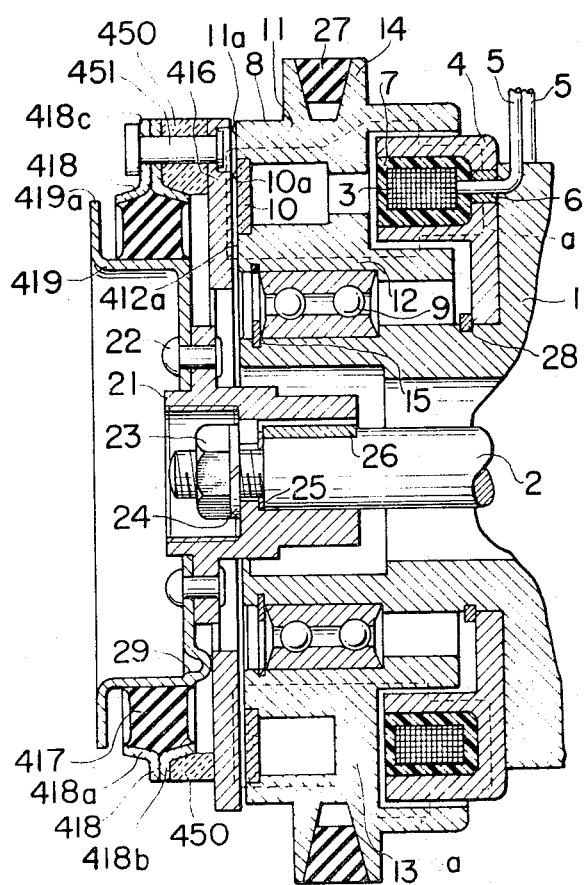
FIG. 16 is a longitudinal sectional view taken along the line XVI - XVI' of FIG. 15.
Figure 17:
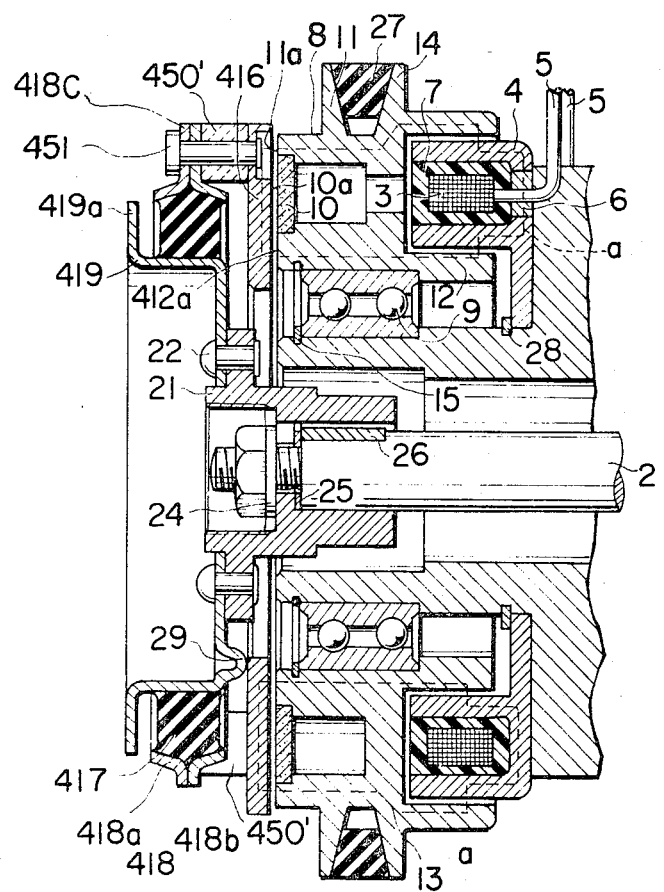
FIG. 17 is a longitudinal section view of a partially modified form

In the embodiment illustrated in FIGS. 15 and 16, a cylindrical coupling member 417 has its inner periphery bonded to the outer periphery of a second retaining plate 419 made of sheet steel formed into a cylindrical shape and the second retaining plate 419 is provided at the edge thereof with a flange portion 419a formed as its integral part and covering the coupling member 417. Numeral 418 designates a first retaining plate formed into Y-shape in section and consisting of two retaining plate members 418a and 418b placed one upon another and each consisting of a member having an annular external form and L-shaped in section, and the inner periphery of the first retaining plate 418 is bonded to the outer periphery of the coupling member 417. In order to improve the strength of the coupling member 417, the forward ends of the inner peripheries of the two retaining plate members 418a and 418b are reduced in cross-sectional area in a tapering manner to thereby compress the sides of the coupling member 417 by about 10 percent. A joint 418c of the two retaining plate members 418a and 418b of the first retaining plate 418 is connected to an armature 416 by a plurality of the rivets 22 with heat insulating members 450 consisting of insulating material such as asbestos being provided on the circumference of the joint 418c and placed between the joint 418c and the armature 416. The second retaining plate 419 is also secured to the hub 21 by a plurality of the rivets 22.

When the armature 416 is attracted to the attracting surfaces 11a and 12a of the main rotating unit 8, an axial deflection stress and a torsion stress in the rotational direction are impulsively applied to the coupling member 417 in such a manner that the two stresses are applied to an increased degree at the joint of the two retaining plates 418 and 419 than at the inner portions. However, since the forward ends of the inner peripheries of the two retaining plate members 418a and 419a are constricted in a tapering manner and thus the coupling member 417 is compressed at the sides thereof thereby improving its strength, the coupling member 417 is provided with a sufficient strength against the axial deflection stress and the torsional stress in the rotational direction.

Although in the embodiment described above the forward ends of the two retaining plate member 418a and 418b are constricted in a tapering manner to form the first retaining plate 418 into a Y-shape in section and thus compress the coupling member 417 at the sides thereof, the section of the first retaining plate 418 needs not necessarily be formed into a Y-shape, but it may be T-shaped in section, for example, to thereby allow the two retaining plate members 418a and 418b to compress the sides of the coupling member 417.

It should be noted that while the second retaining plate and the hub 21 of the rotary shaft are provided separately in the embodiments described above, they may be formed as a unit.

The magnetic clutch according to the present invention has the following remarkable effects:

1. Due to the coupling member being formed into a cylindrical shape, the coupling member can also be permitted to deflect in the axial direction and in this way the coupling member can be made to perform simultaneously the function of lessening the impact force in the rotational direction and the function of returning the armature to its original position upon the termination of attractive force. This results in the complete elimination of three to four leaf springs employed in the conventional magnetic clutches and thus a magnetic clutch is provided which is simplified in construction with a resultant decrease in the number of assembling processes and which is inexpensive to manufacture.
2. Where the coupling member provides the initial reaction force which acts in a direction opposite to that in which the armature is attracted, when the main rotating unit is separated from the armature, the distance between the armature and the main rotating unit can be completely maintained without fail thereby preventing the main rotating unit and the armature from contacting with each other and generating noise.
3. Due to the provision of the heat insulating members between the armature and the first retaining plate, the heat generated by slip caused between the armature and the attracting surfaces of the main rotating unit when the former is attracted to or separated from the latter can be insulated by means of the heat insulating members having a relatively small volume, thereby preventing the coupling member from melting by heat and thus considerably improving the durability of the coupling member without increasing the whole structure of the magnetic clutch.
4. In case the heat radiating members are provided on a portion of the section connecting the armature and the hub of the rotating shaft together, the heat generated by a slip caused between the armature and the attracting surfaces of the main rotating unit when the former is attracted to or separated from the latter can be radiated by the radiation members thereby preventing the coupling member from melting by heat and thus improving the durability of the coupling member considerably.
5. In case the sides of the coupling member are compressed by the two retaining plate members of the first retaining plate, the resulting improvement in the strength of the coupling member can provide the coupling member with sufficient strength against the axial deflection stress and the torsional stress in the rotational direction which will be applied impulsively to the coupling member when the armature is attracted to the main rotating unit. The compression of the sides of the coupling member can also be effected simply by reducing the cross-sectional area of the two retaining plate members at the forward ends of the inner peripheries thereof.

I claim:

1. In a magnetic clutch comprising a main rotating unit rotated from a driving source, a rotary shaft concentric with said main rotating unit and rotatable independent of said main rotating unit and adapted to be connected to a driven member, an armature mechanically connected to said rotary shaft and placed opposite to said main rotating unit in the axial direction, said armature being movable in the axial direction between a first position where said armature is separated from said main rotating unit by a predetermined distance and a second position where said armature is engaged with said main rotating unit to rotate therewith, and energizeable electromagnetic means for attracting said armature from said first position to said second position when energized, the improvement comprising:

a cylindrical elastic material concentric with said rotary shaft and having first and second cylindrical surfaces opposing to each other, first rigid means for mechanically connecting said first cylindrical surface to said armature and second rigid means for mechanically connecting said second cylindrical surface to said rotary shaft, said second rigid means and said second cylindrical surface of said elastic member being axially immovable when said electromagnetic means is energized but said first surface of said elastic member being then axially moved with said first rigid member and said armature when the latter moves to said second position to create thereby in said elastic material an axial elastic strain which is the sole force for returning said armature to said first position when said electromagnetic means is deenergized.

2. A magnetic clutch according to claim 1, further comprising a plurality of projecting heat radiation members provided on at least one of said first and second means.

3. A magnetic clutch according to claim 1, further comprising means for preliminarily providing a strain in said elastic material at said first position of said armature so as to produce an elastic force in a direction away from said rotating unit to help maintain said predetermined distance between said armature and main rotating unit while said armature is supposed to be in said first position.

4. A magnetic clutch according to claim 1 wherein said first means comprises a first retaining plate mechanically connected to said first cylindrical surface of said coupling member, means for mechanically connecting said first retaining plate to said armature and at least one member mounted intermediate to said first retaining plate and said armature so as to provide an air gap therebetween.

5. In a magnetic clutch comprising a main rotating unit rotated from a driving source, a rotary shaft concentric with said main rotating unit and rotatable independent of said main rotating unit and adapted to be connected to a driven member, an armature mechanically connected to said rotary shaft and placed opposite to said main rotating unit in the axial direction, said armature being movable in the axial direction between a first position where said armature is separated from said main rotating unit by a predetermined distance and a second position where said armature is engaged with said main rotating unit to rotate therewith, and magnetic means for attracting said armature from said first position to said second position, the improvement comprising:

a coupling member comprising a cylindrical elastic material concentric with said rotary shaft and having first and second cylindrical surfaces opposing to each other, first means for mechanically connecting said first cylindrical surface to said armature, second means for mechanically connecting said second cylindrical surface to said rotary shaft, said coupling member being subject to an axial elastic strain when said armature is at said second position thereby exerting a force which causes said armature to return to said first position, and means for preliminarily providing a strain in said elastic material at said first position of said armature so as to produce an elastic force in a direction away from said main rotating unit to help maintain said predetermined distance between said armature and main rotating unit while said armature is supposed to be in said first position.

6. A magnetic clutch according to claim 5, wherein said first means comprises a first retaining plate mechanically connected to said armature and having a cylindrical surface firmly attached to the first cylindrical surface of said coupling member, and said second means comprises a second retaining plate having a portion opposed to said armature in the axial direction and mechanically connected to said rotary shaft and a cylindrical surface firmly attached to the second cylindrical surface of said coupling member, said second retaining plate being provided with said preliminary strain means in the form of a plurality of projections projected towards said armature and being in abutment under pressure with the same at a portion thereof opposing to said armature.

7. A magnetic clutch according to claim 6, wherein said projections comprise a plurality of pressing members made of an elastic material and securely mounted on said portion of said second retaining plate opposing to said armature.

8. A magnetic clutch according to claim 5, wherein said first means comprises a first retaining plate having a cylindrical portion formed as an integral part of said armature and concentric with said rotary shaft and the outer periphery firmly attached to the inner surface of said cylindrical portion, and said second means comprises a second retaining plate having a cylindrical portion mechanically connected to said rotary shaft and concentric therewith, said first and second cylindrical surfaces of said coupling member being respectively attached firmly to the inner periphery of said first retaining plate and the outer periphery of said cylindrical portion of said second retaining plate.

9. A magnetic clutch according to claim 5, wherein said first means comprises a retaining plate mounting member attached to said armature and having a cylindrical retaining plate mounting portion concentric with said rotary shaft and a cylindrical portion adjacent to and around the space between said armature and said main rotating unit and a first cylindrical retaining plate having an outer periphery thereof firmly attached to the inner periphery of said cylindrical retaining plate mounting portion, and said second means comprises a second retaining plate having a cylindrical portion mechanically connected to said rotary shaft and concentric therewith, said first and second cylindrical surfaces of said coupling member being respectively attached to the inner periphery of said first retaining plate and the outer periphery of said cylindrical portion of said second retaining plate.

10. A magnetic clutch according to claim 5, further comprising a plurality of projecting heat radiation members provided on at least one of said first and second means.

11. A magnetic clutch according to claim 5, wherein said first means comprises a first retaining plate mechanically connected to said first cylindrical surface of said coupling member, means for mechanically connecting said first retaining plate to said armature and at least one member mounted intermediate to said first retaining plate and said armature so as to provide an air gap therebetween.

12. A magnetic clutch according to claim 5, wherein said first means comprises a first retaining plate having a cylindrical portion firmly attached to said first cylindrical surface of said coupling member, means for mechanically connecting said first retaining plate to said armature and at least one member mounted intermediate to said first retaining plate and said armature so as to provide an air gap therebetween; and said second means comprises a second retaining plate having a portion mechanically connected to said rotary shaft, a cylindrical portion firmly attached to the second cylindrical surface of said coupling member and a flange portion radially extending from the circumferential edge of said cylindrical portion and opposing to said coupling member.

13. A magnetic clutch according to claim 12, wherein said member mounted intermediate to said first retaining plate and said armature is made of an heat insulating material.

14. A magnetic clutch according to claim 5, wherein said first means comprises a first retaining plate having an annular portion firmly attached to the first cylindrical surface of said coupling member and a flange portion integrally formed on and radially extending from said annular portion, means for mechanically connecting said flange portion to said armature and at least one member mounted intermediate to said flange portion and said armature so as to provide an air gap therebetween; and said second means comprises a second retaining plate having a portion connected to said rotary shaft and a cylindrical portion firmly attached to the second cylindrical surface of said coupling member; said annular portion being formed into a V-shaped section opening towards its center and in cooperation with said cylindrical portion of said second retaining plate so as to radially compress said coupling member at its portions near its opposing sides thereby reducing the heights of said portions.

15. A magnetic clutch according to claim 14, wherein said member mounted intermediate to said flange portion and said armature is made of a heat insulating material.

16. In a magnetic clutch comprising a main rotating unit rotated from a driving source, a rotary shaft concentric with said main rotating unit and rotatable independent of said main rotating unit and adapted to be connected to a driven member, an armature mechanically connected to said rotary shaft and placed opposite to said main rotating unit in the axial direction, said armature being movable in the axial direction between a first position where said armature is separated from said main rotating unit by a predetermined distance and a second position where said armature is engaged with said main rotating unit to rotate therewith, and magnetic means for attracting said armature from said first position to said second position, the improvement comprising:

a coupling member comprising a cylindrical elastic material concentric with said rotary shaft and having first and second cylindrical surfaces opposing to each other, first means for mechanically connecting said first cylindrical surface to said armature, second means for mechanically connecting said second cylindrical surface to said rotary shaft, said coupling member being subjected to an axial elastic strain when said armature is at said second position thereby exerting a force which causes said armature to return to said first position, and wherein said first means comprises a first retaining plate mechanically connected to said first cylindrical surface of said coupling member, means for mechanically connecting said first retaining plate to said armature and at least one member mounted intermediate to said first retaining plate and said armature so as to provide an air gap therebetween.

* * * * *